No. 654,873. Patented July 31, 1900.
D. H. CHURCH.
MAINSPRING FASTENER FOR WATCHES.
(Application filed Apr. 14, 1899.)
(No Model.)

WITNESSES:
R. M. Pierson.
P. W. Pezzetti.

INVENTOR:
D. H. Church
by Wright, Brown & Quinby
Attys

UNITED STATES PATENT OFFICE.

DUANE H. CHURCH, OF NEWTON, MASSACHUSETTS.

MAINSPRING-FASTENER FOR WATCHES.

SPECIFICATION forming part of Letters Patent No. 654,873, dated July 31, 1900.

Application filed April 14, 1899. Serial No. 712,971. (No model.)

*To all whom it may concern:*

Be it known that I, DUANE H. CHURCH, of Newton, in the county of Middlesex and State of Massachusetts, have invented certain new and useful Improvements in Springs and Spring-Barrels for Watches and Clocks, of which the following is a specification.

This invention has relation to springs and spring-barrels for watches and clocks constructed and arranged to permit the spring to slip within the barrel after it has been wound beyond a certain point, and has for its object to provide certain improvements therein for maintaining the spring against axial movement in the barrel.

The invention consists of a spring and barrel of the character described having means, as a tongue-and-groove connection, for preventing the spring from leaving the barrel or from working against the going-wheel, all as illustrated upon the drawings, described in the following specification, and pointed out in the claims hereunto appended.

Reference is to be had to the accompanying drawings, and to the letters marked thereon, forming a part of this specification, the same letters designating the same parts or features, as the case may be, wherever they occur.

Figure 1:
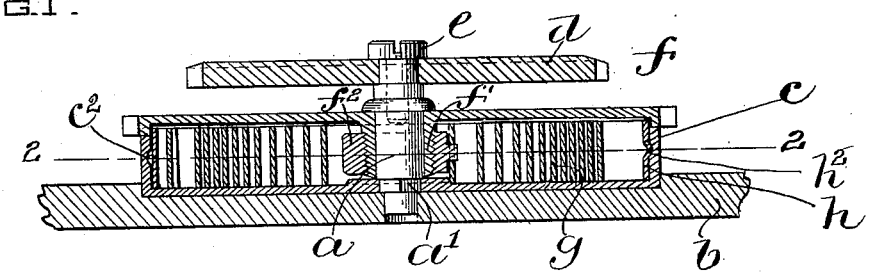
Figure 2:
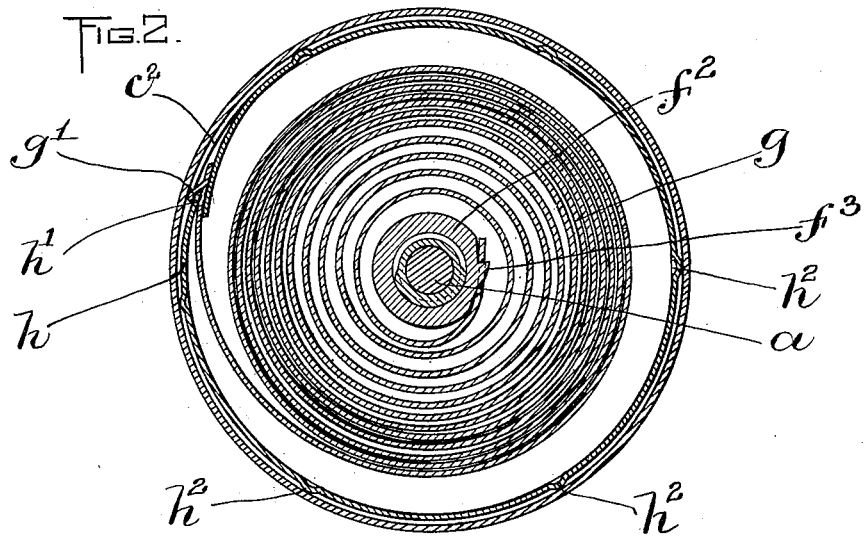
Figure 3:
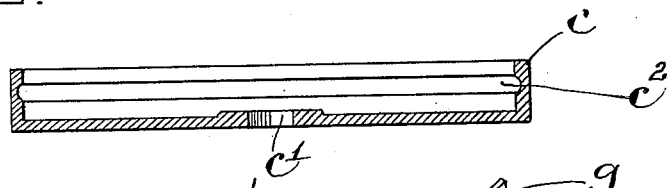
Figure 4:
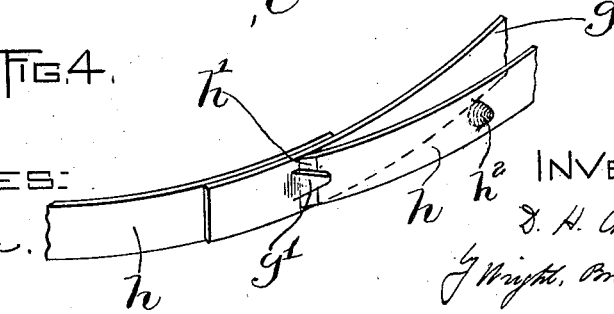

Of the drawings, Figure 1 represents a magnified section through a spring, barrel, and arbor embodying my invention. Fig. 2 represents a horizontal section on the line 2 2 of Fig. 1. Fig. 3 represents a section through the spring-barrel after the arbor and spring have been removed. Fig. 4 shows the devices for connecting the mainspring with the supplemental or drag spring.

On the drawings the arbor $a$, which is journaled in the watch-plate $b$, has a squared portion to fit into a square aperture $c'$ in the barrel $c$. The winding-wheel $d$ is rigidly secured upon the projecting end of the arbor by a screw $e$, while the going-wheel $f$, which covers the barrel and projects therebeyond, has an externally-threaded hub $f'$, on which is screwed a nut $f^2$. The mainspring $g$ has an aperture at its inner end to receive a hook $f^3$ on the nut and at its outer end an outwardly and rearwardly projecting tongue or lip $g'$. The supplemental or drag spring $h$ is beveled at one end, as at $h'$, to slip under the tongue or lip $g'$, and its other end rests against the inner side of the end of the mainspring, so that the two springs are rigidly and detachably connected together and the mainspring is frictionally connected with the barrel. The peripheral wall of the barrel has an internal groove $c^2$, and the drag-spring is provided with a plurality of tongues or projections $h^2$, formed by indenting its inner face, which project into the groove $c^2$, as shown in Fig. 2, the end of the tongue $g'$ likewise extending into said groove. Consequently the frictional engagement of the drag-spring with the barrel is not disturbed, although both springs are held against axial movement and are prevented from rubbing against the going-wheel $f$. The number of projections $h^2$ may be varied as occasion demands.

It will be readily understood that although the lip $g'$ and the projections $h^2$ extend into the groove $c'$ there is no liability of these parts contacting with the wall of the barrel in case the mainspring should break. As shown, there is only the frictional contact between the drag-spring and the wall, and therefore when the spring breaks the drag-spring will be carried around with the broken end of the mainspring without detriment to the works of the watch, while all tendency of the breaking of the mainspring when being wound is entirely overcome, as is usual in this class of watches. It will also be readily understood that by reason of the fact that the peripheral groove $c^2$ is formed with no obstructions, being continuous, there is a continuous unobstructed passage-way formed for the lip $g'$ and projections $h^2$, which extend into said groove, allowing the mainspring and drag-spring to have a free frictional movement relative to the barrel, axial movement being prevented, as hereinbefore set forth.

Having thus explained the nature of the invention and described a way of constructing and using the same, although without attempting to set forth all of the forms in which it may be made or all the modes of its use, I declare that what I claim is—

1. The combination of a spring and a barrel, of which elements one is formed with a continuous groove and the other is formed with a projection to slide in said groove, the spring and barrel having a free and unobstructed frictional movement relative to each other, whereby said spring and barrel are held against axial movement relatively each to the other.

2. The combination of a spring and barrel said spring having a tension device, of which elements one is formed with a continuous groove and the other is formed with a projection to slide in said groove, the spring and barrel having a free and unobstructed frictional movement relative to each other, whereby said spring and barrel are held against relative axial movement.

3. The combination of a mainspring, a barrel and a supplemental or drag spring for frictionally connecting the mainspring with the barrel, said barrel having a continuous internal groove, and said main and drag springs having one or more projections extending into said groove, whereby said springs and barrel will be permitted to have a free and unobstructed frictional movement relatively to each other and will be prevented from having a relative axial movement.

4. The combination of a mainspring, a barrel, a supplemental or drag spring for frictionally connecting the mainspring with the barrel, and means formed on each of said elements and coöperating with each other for preventing the springs from having an axial movement relative to the barrel, said means permitting the springs and barrel to have a free and unobstructed frictional movement relatively each to the other.

5. The combination of a barrel, a mainspring, and a supplemental or drag spring extending oppositely to the mainspring and interposed between the mainspring and the barrel to frictionally connect them, but permitting movement in either direction, said mainspring having at its end a rearwardly-projecting tongue or lip, said drag-spring having its end removably engaged with said tongue or lip, said tongue or lip also serving to retain the spring from vertical movement relatively to the barrel.

6. The combination of an internally-grooved barrel; a mainspring, having its outer end provided with a rearwardly-extending tongue or lip; a drag-spring removably secured between the mainspring and said tongue or lip, said drag-spring extending opposite to the mainspring and interposed between it and the barrel, to frictionally connect them; and outwardly-extending projections formed on said drag-spring, said projections and said tongue or lip extending into said groove, being adapted to prevent axial movement of said main and drag springs relatively to said barrel, without preventing movement of said springs in either direction horizontally.

In testimony whereof I have affixed my signature in presence of two witnesses.

DUANE H. CHURCH.

Witnesses:
M. B. MAY,
P. W. PEZZETTI.